US009882222B2

(12) United States Patent
Kuttiyiel et al.

(10) Patent No.: US 9,882,222 B2
(45) Date of Patent: Jan. 30, 2018

(54) NITRIDE STABILIZED CORE/SHELL NANOPARTICLES

(71) Applicant: Brookhaven Science Associates, LLC, Upton, NY (US)

(72) Inventors: Kurian Abraham Kuttiyiel, New Hyde Park, NY (US); Kotaro Sasaki, Hauppauge, NY (US); Radoslav R. Adzic, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days.

(21) Appl. No.: 14/554,583

(22) Filed: Nov. 26, 2014

(65) Prior Publication Data

US 2015/0147682 A1    May 28, 2015

Related U.S. Application Data (60) Provisional application No. 61/909,743, filed on Nov. 27, 2013.

(51) Int. Cl.
*H01M 4/90* (2006.01)
*B01J 23/40* (2006.01)
(Continued)

(52) U.S. Cl.
CPC ............ *H01M 4/92* (2013.01); *H01M 4/8657* (2013.01); *H01M 4/921* (2013.01); *H01M 4/923* (2013.01);
(Continued)

(58) Field of Classification Search
CPC ...... H01M 4/9058; H01M 4/885; H01M 4/90; H01M 4/88; H01M 4/92; H01M 4/8853;
(Continued)

(56) References Cited

U.S. PATENT DOCUMENTS

| 6,670,301 | B2 | 12/2003 | Adzic et al. |
| 7,507,495 | B2 | 3/2009 | Wang et al. |
| 7,691,780 | B2 | 4/2010 | Adzic et al. |
| 7,704,918 | B2 | 4/2010 | Adzic et al. |
| 8,227,372 | B2 | 7/2012 | Lopez et al. |
| 2011/0020729 | A1* | 1/2011 | Monden ........... H01M 4/90 429/483 |
| 2011/0155579 | A1* | 6/2011 | Wang ........... B01J 21/18 205/103 |

(Continued)

FOREIGN PATENT DOCUMENTS

JP          200731781          2/2007

OTHER PUBLICATIONS

Kuttiyiel et al Nitride Stabilized PtNi Core-Shell Nanocatalyst for High Oxygen Reduction Activity.*

(Continued)

*Primary Examiner* — Stephen Yanchuk
(74) *Attorney, Agent, or Firm* — Dorene M. Price; Lars O. Husebo (57) ABSTRACT

Nitride stabilized metal nanoparticles and methods for their manufacture are disclosed. In one embodiment the metal nanoparticles have a continuous and nonporous noble metal shell with a nitride-stabilized non-noble metal core. The nitride-stabilized core provides a stabilizing effect under high oxidizing conditions suppressing the noble metal dissolution during potential cycling. The nitride stabilized nanoparticles may be fabricated by a process in which a core is coated with a shell layer that encapsulates the entire core. Introduction of nitrogen into the core by annealing produces metal nitride(s) that are less susceptible to dissolution during potential cycling under high oxidizing conditions.

12 Claims, 7 Drawing Sheets (51) Int. Cl.
    *H01M 4/92*    (2006.01)
    *H01M 4/86*    (2006.01)
    *H01M 8/1018*    (2016.01)

(52) U.S. Cl.
    CPC .............. *H01M 4/926* (2013.01); *B01J 23/40* (2013.01); *H01M 2008/1095* (2013.01)

(58) Field of Classification Search
    CPC ................ H01M 4/926; H01M 4/921; H01M 2008/1095; B01J 27/25; B01J 23/38; B01J 23/40; B01J 23/42; B01J 23/44; B01J 23/46; B01J 23/462; B01J 23/464; B01J 23/466; B01J 23/468; B01J 23/48; B01J 23/50; B01J 23/52; B01J 23/56
    See application file for complete search history.

(56) References Cited

U.S. PATENT DOCUMENTS

2013/0045865 A1* 2/2013 Thompson ............... B01J 37/08
                                                      502/177
2013/0280637 A1    10/2013 Horibe

OTHER PUBLICATIONS

Wang C., et al., "Correlation Between Surface Chemistry and Electrocatalytic Properties of Monodisperse Pt x Ni 1-x Nanoparticles", Adv. Funct. Mater. (2011), 21, pp. 147-152.

* cited by examiner

NITRIDE STABILIZED CORE/SHELL NANOPARTICLES

CROSS-REFERENCE TO A RELATED APPLICATION

This application claims the benefit under 35 U.S.C. 119(e) of U.S. Provisional Application No. 61/909,743 filed on Nov. 27, 2013, the content of which is incorporated herein in its entirety.

STATEMENT OF GOVERNMENT RIGHTS

This invention was made with Government support under contract number DE-AC02-98CH10886, awarded by the U.S. Department of Energy. The Government may have certain rights in this invention.

FIELD OF THE INVENTION

This disclosure relates to the field of electrochemical catalysts and the methods for their manufacture and use. In particular, the disclosure relates to nanometer-scale electrocatalysts, primarily platinum based, with a nitrogen stabilized core, and a method of using the synthesized electrocatalysts for polymer electrolyte fuel cells.

BACKGROUND

Metals such as platinum (Pt), palladium (Pd), ruthenium (Ru), and related alloys are known to be excellent catalysts. When incorporated in electrodes of an electrochemical device, such as a fuel cell, these materials function as electrocatalysts as the materials accelerate electrochemical reactions at electrode surfaces, yet are not themselves consumed by the overall reaction. Although noble metals have been shown to be some of the best electrocatalysts, their successful implementation in commercially available energy conversion devices may be limited due to high cost and scarcity. Noble metal catalysts may also be susceptible to carbon monoxide (CO) poisoning, poor stability under cyclic loading, and providing relatively slow conversion kinetics in oxygen reduction reactions (ORR).

A variety of approaches have been employed in attempts to address these issues. One approach involves increasing the overall surface area available for reaction by forming metal particles with nanometer-scale dimensions. Loading of more expensive noble metals such as Pt has been reduced by forming nanoparticles from alloys comprised of Pt and a low-cost component. Further improvements have been attained by forming core-shell nanoparticles, in which a core particle is coated with a shell of a different material that functions as the electrocatalyst. The core is usually a low-cost material which is easily fabricated whereas the shell comprises a more catalytically active noble metal. An example is provided by U.S. Pat. No. 6,670,301 to Adzic, et al., which discloses a process for depositing a thin film of Pt on dispersed Ru nanoparticles supported by carbon substrates. Another example is U.S. Pat. No. 7,691,780 to Adzic, et al. which discloses platinum- and platinum alloy-coated palladium and palladium alloy nanoparticle cores. Each of the aforementioned U.S. patents is incorporated by reference in its entirety as if fully set forth in this specification.

One approach for synthesizing core-shell particles with reduced noble metal loading and enhanced activity levels involves the use of electrochemical routes, which provide atomic-level control over the formation of uniform and conformal ultrathin coatings of the desired material on a large number of three-dimensional nanoparticles. One such method involves the initial deposition of an atomic monolayer of a metal such as copper (Cu) onto a plurality of nanoparticles by underpotential deposition (UPD). This is followed by galvanic displacement of the underlying Cu atoms by a noble metal such as Pt as disclosed, for example, in U.S. Pat. No. 7,704,918 to Adzic, et al. Another method involves hydrogen adsorption-induced deposition of a monolayer of metal atoms on noble metal particles as described, for example, by U.S. Pat. No. 7,507,495 to Wang, et al. Each of the aforementioned U.S. patents is incorporated by reference in its entirety as if fully set forth in this specification.

Core-shell particles having a core comprised of one or more non-noble metals may show gradual dissolution of the non-noble metal component over time. Exposure of the core to the corrosive environment typically present in energy conversion devices such as a proton exchange membrane fuel cell (PEMFC) due to, for example, an incomplete protective shell layer may result in gradual erosion of the non-noble metal components which leads to the loss of structural integrity of the particles. With continued operation, reduction in structural integrity may reduce the catalytic activity of the electro catalyst and cause damage to the electrolyte membranes contained within a typical energy conversion device, thereby reducing its charge storage and energy conversion capabilities.

There is therefore a continuing need to develop catalysts with a still higher catalytic activity in combination with ever-lower loading of precious metals, enhanced durability, and long-term stability. Such catalysts should also be capable of being manufactured by large-scale and cost-effective processes suitable for commercial production and incorporation in conventional energy production devices.

SUMMARY

In view of the above-described problems, needs, and goals, a novel electrocatalytic nanoparticle with a nitride stabilized non-noble metal or non-noble metal alloy core is provided that has utility in, among others, electrochemical reactions, such as fuel cells, for example, polymer electrolyte membrane fuel cells (PEMFCs). In one embodiment, the nanoparticle has nano-sized external dimensions and is characterized by a continuous and nonporous shell with a nitride stabilized core. In a particular embodiment the structure of the nitride stabilized core is such that it enhances the shell's oxygen-reduction reaction (ORR) activity and provides a stabilizing effect under highly oxidizing conditions found in fuel cells, thus, suppressing dissolution during potential cycling. In another embodiment the disclosed nanoparticle is manufactured by a method which, in its most basic form, involves a chemical reduction and subsequent thermal annealing in nitrogen gas ($N_2$) followed by using ammonia ($NH_3$) as a nitrogen precursor at ambient pressure to form a metal nitride core and a thin noble metal shell. The manufacturing process is simple and cost-effective, providing nitride stabilized nanoparticles with still higher catalytic activities and improved durability in combination with minimal loading of precious materials as compared with catalysts currently in use.

In one embodiment, the nanoparticle cores are comprised of a nitride of a single non-noble transition metal, but may comprise a plurality of elements or components. When more than one transition metal is used, the nanoparticle alloy may be a homogeneous solid solution, but it may also have compositional nonuniformities. The nitride of the non-noble transition metal may be at least one of nickel (Ni) nitride, cobalt (Co) nitride, iron (Fe) nitride, copper (Cu) nitride, and/or their alloys. In an embodiment, the nitride is nickel nitride ($Ni_4N$). The nanoparticle cores provide a template for deposition of one or a plurality of noble metals on core surfaces and also provide a durable core for forming the noble metal shells.

In another embodiment, the material constituting the shell layer is a noble metal, and in another embodiment the shell is a noble metal alloyed with one or more transition metals, including other noble metals. In an embodiment, the composition of the shell is homogeneous. However, the composition may, in other embodiments, be nonuniform. The noble metal shell may be comprised of at least one of palladium (Pd), iridium (Ir), rhenium (Re), ruthenium (Ru), rhodium (Rh), osmium (Os), gold (Au), and platinum (Pt), either alone or as an alloy. In an embodiment the shell is comprised of Pt. In yet another embodiment the shell is comprised of Pd or a Pd/Au alloy.

The disclosed core-shell nanoparticles have a continuous and nonporous external surface with a nitride stabilized core. In one embodiment the nanoparticles are substantially spherical with an external diameter of less than 20 nm and a shell thickness of between 0.5 and 3 nm or, alternatively, a shell wall thickness of 1 to 12 atomic layers. In another embodiment, the external diameter of the nanoparticles is between 2 nm and 10 nm with a shell wall thickness of 2 to 8 atomic layers. In yet another embodiment the nanoparticles have an average external diameter of 3.5 nm, and a shell wall thickness of 2 to 4 atomic layers. In one embodiment, the core of the nanoparticle has at least 2 wt. % metal nitride. In another embodiment, the core of the nanoparticle has at least 5 wt. % metal nitride. In yet another embodiment, the core of the nanoparticle has at least 20 wt. % metal nitride. The nanoparticles may be made of Pt shell and $Ni_4N$ core, but may also be made of Ir, Pd or a Pd/Au alloy shell and the $Ni_4N$ core. In yet another embodiment the nanoparticles are made of $Ni_4N$ core, an Ir, Pd or a Pd/Au alloy first shell which is covered with one or two monolayers of Pt shell. In an embodiment, the nanoparticle has a platinum (Pt) shell having a shell wall thickness of 2 to 4 atomic layers and nickel (Ni) core made with at least 5 wt. % nickel (Ni) nitride.

In a further embodiment the nitride stabilized nanoparticles are formed on carbon supports by a process of (1) preparing an aqueous solution containing salts of a noble metal and a non-noble transition metal together and a carbon powder, (2) forming a plurality of nanoparticles by adding a chemical reducing agent, and (3) annealing the nanoparticles under nitrogen gas and/or under ammonia gas. The chemical reducing agent may be $NaBH_4$ or $N_2H_4$ with NaOH or $Na_2CO_3$ being used to adjust the solution pH. In the absence of oxygen, a solution comprising a salt of the second metal may be added into the slurry of the thus-formed core metal nanoparticles to form a thin shell layer of the second metal on the core of the first metal.

The metal solution may, for example, comprise a soluble salt of Ni and a soluble salt of Pt in aqueous solution. The soluble salt of Ni may be, for example, $Ni(HCO_2)_2 \cdot 2H_2O$. The soluble salt of Pt may be, for example, $K_2PtCl_4$. Formation of the core/shell nanoparticles may be initiated by adding a reducing agent, for example, $NaBH_4$. Introducing nitrogen into the core of the nanoparticles may be accomplished by annealing the prepared core/shell nanoparticles at 200 to 300° C. under $N_2$ gas and thereafter annealing the core/shell nanoparticles at 400 to 700° C. under $NH_3$ to form a core comprising nickel nitride $Ni_4N$. In another embodiment the salt of the noble metal for the formation of the shell comprises of $Pd(NH_3)_4Cl_2$ and is used in combination with a Ni salt to form nitride stabilized Ni—Pd core-shell nanoparticles. In yet another embodiment, the salt of the noble metal for the formation of the shell comprises $Pd(NH_3)_4Cl_2$ and $HAuCl_3$ and is used in combination with a Ni salt to form Ni—PdAu core-shell nanoparticles. In yet another embodiment, the salt of the noble metal for the formation of the shell comprises $(NH_4)_2IrCl_6$ and is used in combination with a Ni salt to form Ni—Ir core-shell nanoparticles.

In still another embodiment, the nitride stabilized nanoparticles are formed on carbon supports by (1) forming a nitride stabilized core, and (2) coating the core with a noble metal shell by galvanic displacement. The core can be prepared by a process of (1) forming a thin film of a carbon powder on an electrode, (2) preparing a pH-buffered solution containing a salt of a metal, (3) immersing the electrode in the pH-buffered solution, (4) applying a first potential pulse to reduce the metal and nucleate metal nanoparticles on surfaces of the carbon powder, (5) applying a second potential pulse to increase the size of the nucleated metal nanoparticles, and (6) annealing the prepared nanoparticle core with nitrogen gas followed by ammonia gas.

In a still further embodiment, the nitride stabilized nanoparticles may be formed by a method of producing a plurality of nanoparticles of a first metal by pulse potential deposition in a solution composed of a salt of the first metal. The method further involves annealing the produced nanoparticles with gases of nitrogen and/or ammonia. Finally the method includes forming a shell layer of a second metal, which is a noble metal, on an external surface of the nanoparticles to form core-shell nanoparticles. In an aspect of this embodiment the shell layer is formed by transferring the nanoparticles to and immersing the nanoparticles in a solution comprising a salt of the second metal in the absence of oxygen.

Nitride stabilized nanoparticles are particularly advantageous when incorporated into one or more electrodes of an energy conversion device. The structure of such a device is designed with at least a first electrode, a conducting electrolyte, and a second electrode, in which one or more of the first or second electrodes comprises metal nanoparticles. These nanoparticles have a continuous and nonporous shell with a nitride stabilized metal core. It is shown herein that the nitrogen and the nanoparticle structure increase the catalytic activity of the noble metal shell and provide a stabilizing effect under highly oxidizing conditions that suppresses dissolution during potential cycling. In an embodiment, the nitride stabilized nanoparticles incorporated into an energy conversion device are comprised of Pt and have an external diameter of 3 nm to 20 nm with a shell wall thickness of 2 to 4 atomic monolayers.

In present embodiments, the production of nitride stabilized nanoparticles permits a reduction in loading of precious materials while simultaneously enhancing the catalytically active surface area and improving stability and durability of the resulting energy conversion devices. The use of nitride stabilized nanoparticles as electro catalysts facilitates more efficient, durable, and cost-effective electrochemical energy conversion in devices such as fuel cells and metal-air batteries. The use of Pt-based nitride stabilized nanoparticles may also provide similar advantages when used as a catalyst for oxidation of small organic molecules such as methanol and ethanol, where weakening Pt reactivity can enhance the catalyst's tolerance to poisoning intermediates or for hydrogenation reactions in producing renewable fuels.

These and other characteristics of the nitride stabilized nanoparticles, a method of synthesis/manufacture thereof, and a method of use will become more apparent from the following description and illustrative embodiments which are described in detail with reference to the accompanying drawings. Similar elements in each figure are designated by like reference numbers and, hence, subsequent detailed descriptions thereof may be omitted for brevity.

DETAILED DESCRIPTION

Previous approaches to producing catalyst particles with a higher catalytic activity and reduced loading of costly precious metals have typically involved the use of one or more components which are susceptible to corrosion in alkaline or acidic environments. Over time, the gradual loss of these elements and their subsequent buildup in other critical components present within the energy conversion device, e.g., an electrolyte membrane, reduces both the activity level of the catalyst particles and the overall efficiency of the device.

These and other issues are addressed by embodiments disclosed herein in which electrocatalytic nanoparticles have a corrosion-resistant core exhibiting a heightened catalytic activity and improved durability have been developed. It is believed that the enhanced activity and durability is attributable at least partly to geometric and electronic effects, in which the presence of a nitride within the non-noble metal core suppresses core dissolution during potential cycling and reduces lattice contraction leading to an up-shifted noble metal d-band center. While not wishing to be bound by any particular theory, the analysis described herein reveals that nitride-induced contraction strengthens oxygen binding at nanoparticle surfaces compared to a non-noble metal core alone, yet increases lattice contraction leading to a down-shifted noble metal d-band center compared to the noble metal alone.

It is envisioned that one or more metals, as well as mixtures or alloys of these metals may be used as the material constituting the core and/or shell material without deviating from the spirit and scope of the present invention. Throughout this specification, the nitride stabilized nanoparticles and processes for their manufacture will be described using one or more metals due to the advantages provided by their use as electrocatalysts and/or catalysts in general.

I. Nanoparticle Core

Initially, nanoparticle cores of a suitable metal or metal alloy are prepared using any technique that is well-known in the art. It is to be understood, however, that the present embodiments are not limited to nanoparticle cores that are comprised of a single element or material throughout, and the nanoparticle cores may also include nanoparticle alloys. A nanoparticle alloy is defined as a particle formed from a complete solid solution of two or more elemental metals. However, such nanoparticle alloys are not limited to homogeneous solid solutions, but may also be inhomogeneous or heterogeneous. That is, the nanoparticle alloy may not have an even concentration distribution of each element throughout the nanoparticle itself. There may be precipitated phases, immiscible solid solutions, concentration nonuniformities, and some degree of surface segregation.

The nanoparticle cores may be spherical or spheroidal with a size ranging from 2 nm to 100 nm along at least one of three orthogonal axes, and are thus nanometer-scale particles or nanoparticles. It is to be understood, however, that the particles may take on any shape or structure which includes, but is not limited to branching, conical, pyramidal, cubical, cylindrical, mesh, fiber, cuboctahedral, icosahedral, and tubular nanoparticles. The nanoparticles may be agglomerated or dispersed, formed into ordered arrays, fabricated into an interconnected mesh structure, either formed on a supporting medium or suspended in a solution, and may have even or uneven size distributions. The particle shape and size may be configured to maximize surface catalytic activity. In an embodiment the nanoparticle cores have external dimensions of less than 12 nm along at least one of three orthogonal directions. Throughout this specification, the exemplary nanoparticles will be primarily disclosed and described as substantially spherical in shape.

Solid nanoparticles, which are also known as nanocrystals or quantum dots, have been formed from a wide variety of materials using a number of different techniques which involve both top-down and bottom-up approaches. Examples of the former include standard photolithography techniques, dip-pen nanolithography, and focused ion-beam etching. The latter comprises techniques such as electrodeposition or electroplating onto templated substrates, laser ablation of a suitable target, vapor-liquid-solid growth of nanowires, and growth of surface nanostructures by thermal evaporation, sputtering, chemical vapor deposition (CVD), or molecular beam epitaxy (MBE) from suitable gas precursors and/or solid sources.

Solid nanoparticles may also be formed using conventional powder-processing techniques such as comminution, grinding, or chemical reactions. Examples of these processes include mechanical grinding in a ball mill, atomization of molten metal forced through an orifice at high velocity, centrifugal disintegration, sol-gel processing, and vaporization of a liquefied metal followed by supercooling in an inert gas stream. Nanoparticles synthesized by chemical routes may involve solution-phase growth in which, as an example, sodium boron hydride, superhydride, hydrazine, or citrates may be used to reduce an aqueous or nonaqueous solution comprising salts of a non-noble metal and/or noble metal. Alternatively, the salt mixtures may be reduced using $H_2$ gas at temperatures ranging from 150° C. to 1,000° C. These chemical reductive methods can be used, for example, to make nanoparticles of nickel (Ni), cobalt (Co), iron (Fe), copper (Cu), and/or their combinations or alloys. Powder-processing techniques are advantageous in that they are generally capable of producing large quantities of nanometer-scale particles with desired size distributions.

In one embodiment, nanoparticle cores may be formed on a suitable support material by pulse electrodeposition. This method involves initially preparing a thin film of a carbon powder on a glassy carbon electrode. Prior approaches have typically used a thin layer of Nafion, a polymer membrane, to affix the carbon powder onto the glassy carbon electrode. However, in this embodiment Nafion is not needed since a thin film of carbon powder is formed directly onto the glassy carbon electrode. A pH-buffered solution containing a salt of the metal to be reduced is then produced and the carbon-coated electrode is immersed in the solution. Reduction of the metal itself is accomplished by applying a first potential pulse to reduce the metal ions from solution and nucleate metal nanoparticles on the surfaces of the carbon powder support. This is followed by a second potential pulse whose duration is used to control the final size of the thus-formed nanoparticles.

The first potential pulse is thus used to control the nucleation rate whereas the second potential pulse is used to drive subsequent growth of the nucleated nanoparticles. By using two separate potential pulses, both the number density and the size of nanoparticle cores produced can be independently controlled by the duration of the pulses at the two potentials. In one embodiment, the first potential may range from −0.5 V to −0.2 V, while the second potential may range from −0.3 V to −0.1 V. In another embodiment the first potential may range from −1.6 V to −1.0 V, whereas the second potential ranges from −0.9 V to −0.7 V. All potential pulses are typically measured versus a Ag/AgCl (3 M NaCl) reference electrode.

When forming nanoparticle cores from a solution containing non-noble metal ions, the pH of the solution may be higher than 4 so that the metal nanoparticles formed after potential pulse deposition will be stable. A suitable non-noble metal solution to produce Ni or Co nanoparticle cores may comprise 0.1 M to 0.5 M $NiSO_4$ or $CoSO_4$, respectively, with 0.5 M $H_3BO_3$. It is contemplated that other soluble salts of Ni may also be used. Pulse potential deposition of Ni or Co nanoparticle cores may then proceed by applying a first potential pulse in the range of −1.6 V to −1.0 V, followed by a second potential pulse in the range of −0.9 V to −0.7 V. All potentials are typically measured versus a Ag/AgCl (3 M NaCl) reference electrode with the pulse duration being adjusted to obtain the desired density and size distribution.

In another embodiment nanoparticle cores may be formed by adding a chemical reducing agent to a solution comprising a salt of the desired metal. A typical reducing agent is $NaBH_4$ or $N_2H_4$ with NaOH or $Na_2CO_3$ being added to adjust the pH of the solution. An exemplary solution that may be used to form Ni nanoparticle cores on a carbon support comprises 10 mg carbon powder, 3 ml $H_2O$, and 1 ml 0.1 M $NiSO_4$ or $NiCl_2$. Prior to adding the reducing agent to reduce the Ni nanoparticles, the solution may be sonicated and deaerated. The reduction process proceeds by adding a small amount of the reducing agent to the slurry while vigorously stirring the solution in a deaerated environment at room temperature to produce Ni nanoparticles dispersed on a carbon powder support. In a particular embodiment, the solution contains an excess of Ni ions to ensure that the added reducing agent is fully consumed.

By using a small amount of a strong reducing agent to control the particle size, the need for a surfactant is substantially reduced or eliminated. Furthermore, the process mimics pulse potential deposition, as described above, since the reaction initially occurs very rapidly and then is abruptly terminated once the reducing agent has been fully consumed. Besides avoiding the use of a surfactant, consumption of all of the reducing agent allows subsequent processes to be performed in the same solution. For example, a salt of a different metal may be added to the reactor without needing to first filter out the thus-formed nanoparticle cores and create a new solution. This is particularly advantageous when forming a shell layer by galvanic displacement since a salt of a noble metal can be added directly to the solution as described in Section II below.

In yet another embodiment, nanoparticle cores may be formed by heating a dry mixture of carbon and adsorbed first metal ions in hydrogen. The carbon may be in powder or nanotube form and may be functionalized by immersing in $HNO_3$ and $H_2SO_4$ mixed acids, resulting in anion groups, such as, —$CO_2H$ and —$SO_3H$, being attached at the carbon surface. The exemplary dry mixture of carbon and the first metal ions is formed by stirring a slurry comprising a salt of first metal and functionalized carbon powder or carbon nanotubes for more than 10 hours, and then, filtering out the aqueous solution. After being dried at room temperature, the mixture is heated to about 700° C. in hydrogen for about 2 hours yielding nanoparticles of the first metal on a carbon support. Before proceeding with the production of the nitride stabilized nanoparticles, the carbon-supported nanoparticle cores of the first metal may be cooled in liquid argon (Ar).

It is to be understood that the methods of forming the nanoparticles described above are merely exemplary. Alternative methods which are well-known in the art and which are capable of forming nanoparticles with the desired shape, size, and composition may be employed. The key aspect is that the nanoparticles provide a template of a predetermined size onto which a shell layer can be deposited. In an embodiment, the size of the nanoparticle cores is adjusted to maximize the catalytic activity of the resulting nitride stabilized nanoparticles.

II. Nanoparticle Shell

Once nanoparticles having the desired shape, composition, and size distribution have been fabricated, the desired shell layer may then be formed. The particular process used to form the shell layer is not intended to be limited to any particular process, but is generally intended to be such that it permits formation of films having thicknesses in the monolayer-to-multilayer thickness range. It is to be understood, however, that while the process of preparing core-shell nanoparticles is described sequentially, the cores and the shells of the core-shell nanoparticles can also be formed in parallel.

For purposes of this specification, a monolayer (ML) is formed when the surface of a substrate, e.g., a nanoparticle, is fully covered by a single, closely packed layer comprising adatoms of a second material which forms a chemical or physical bond with atoms at the surface of the substrate. The surface is considered fully covered when substantially all available surface sites are occupied by the adatoms of the second material. The surface may be considered fully covered when more than 90% of all available surface sites are occupied by the adatoms of the second material, or when more than 95% of all available surface sites are occupied by the adatoms of the second material. When more than about 90% of all available surface sites are occupied the shell is considered to be continuous and nonporous. If less than 90% of the surface sites of the substrate are not completely occupied, then the surface coverage is considered to be submonolayer. However, if a second layer or subsequent layers of the adsorbant are deposited onto the first layer, then multilayer surface coverages, e.g., bilayer, trilayer, etc., result and are considered continuous and nonporous.

The process for forming a shell layer by galvanic displacement occurs when the nanoparticle cores are immersed into a solution comprising a salt of a noble metal. Since the salt is a noble metal salt and the core material is a non-noble metal or non-noble metal alloy, an irreversible and spontaneous redox reaction occurs, in which core surface atoms are oxidized and replaced by the noble ions contained in solution. The ratio of the outer and inner diameters of the thus-formed nanoparticles can be controlled by varying the concentration of the noble metal ions and the duration for which the cores are immersed in the noble metal salt solution.

As an illustrative embodiment, nanoparticle cores of a non-noble metal such as Cu, Ni, or Fe may be initially produced using any of the techniques described in the foregoing Section I. The use of galvanic displacement is, however, especially advantageous when combined with chemical synthesis routes for the production of nanoparticle cores. Galvanic displacement proceeds by introducing the nanoparticles to a solution comprising a salt of a noble metal such as, for example, Pt, Pd, Ir, Ru, Os, Au, or Re, by immersion in a solution comprising one or more of $K_2PtCl_4$, $PdCl_2$, $IrCl_3$, $RuCl_3$, $OsCl_3$, $HAuCl_3$, or $ReCl_3$, respectively.

Using a Ni core and a Pt salt as an example, the galvanic replacement of surface Ni atoms by Pt occurs via the reaction $Ni+Pt^{2+} \rightarrow Ni^{2+}+Pt$ to produce Ni—Pt core-shell nanoparticles. Replacement of Ni surface atoms by Pt results in a reduction of the size of the Ni nanoparticle core. The final thickness and surface coverage by the resulting noble metal shell layer can be controlled by varying process parameters, such as the concentration of the noble metal salt and the duration of the immersion in solution. In practice, many Ni particles of less than 3 nm in diameter disappeared after immersion in solution, suggesting that they were completely replaced by Pt, and that during the process the Pt atoms were deposited onto large nearby particles. This may have the effect of increasing the overall size distribution of the remaining Ni—Pt core-shell nanoparticles. The dissolution of smaller Ni cores is actually beneficial because it is generally undesirable to have Ni particles having sizes of less than 3 nm which inevitably formed during synthesis of the Ni cores without using surfactants. Furthermore, the shell layer formed via galvanic displacement is not limited to a single metal, but may be formed as an alloy having several constituents to form a binary, ternary, quaternary, or quinary alloy. This may be accomplished, for example, by including more than one noble metal salt in the solution.

An important aspect of shell formation via galvanic displacement is the inhibition of oxidation of and/or removal of any oxide formed on the surfaces of the nanoparticle cores once they have been fabricated. The formation of a surface oxide layer significantly inhibits the galvanic displacement process, by forming metal-oxygen bonds at nanoparticle core surfaces. Thus, transfer into a solution comprising a metal salt to facilitate galvanic displacement by a noble metal is preferably accomplished in the absence of oxygen.

In one embodiment, galvanic displacement is performed by immersing the nanoparticle cores in a solution comprising 0.05 mM to 5 mM $K_2PtCl_4$ to produce a Pt shell layer. In another embodiment a Pd shell layer may be formed by immersing the nanoparticle cores in a solution comprising 0.05 mM to 5 mM $Pd(NH_3)_4Cl_2$. In yet another embodiment a Pd/Au shell layer may be formed by immersing the particles cores in a solution comprising 0.5 mM $Pd(NH_3)_4Cl_2$ and 0.025 mM $HAuCl_3$. In yet another two embodiments a Ru and an Ir shell layers may be formed by immersing the particle cores in a solution comprising 1 mM $RuCl_3$ and $IrCl_3$, respectively. The duration of exposure in each of these exemplary metal salts may be calculated to obtain the desired thickness of the shell layer.

In an embodiment, carbon-supported nanoparticle cores of a non-noble metal such as Ni or Co are formed using the chemical reduction, dry heat treatment under hydrogen, or pulse potential deposition processes, as described in Section I above. When pulse potential deposition is used, the nanoparticles are transferred to a solution comprising the desired noble metal salt in the absence of oxygen. When forming non-noble metal nanoparticle cores using chemical reduction methods, the non-noble metal salt is present in excess, such that the reduction reaction proceeds to completion and all of the reducing agent is consumed. This permits addition of the desired concentration of a noble metal salt directly to the solution, thereby avoiding the need to filter out and rinse the core nanoparticles formed by chemical reduction methods. This is advantageous because it prevents exposure of the nanoparticle cores to the ambient atmosphere where a surface oxide may form.

III. Nitridation of the Core

Once core-shell nanoparticles having the desired shape, composition, and size distribution have been fabricated, the nitrogen may then be introduced into the core. The particular process used to introduce nitrogen into the core is not intended to be limited to any particular process, but is generally intended to permit formation of a metal nitride within the core. It is to be understood, however, that while the process of preparing nitride stabilized core-shell nanoparticles is described sequentially, the process of introducing nitrogen into the core can also be done during the core formation, during the shell formation, or both.

The metal nitride formation within the core may be initiated by thermal annealing the core-shell nanoparticles for 1 to 20 hours, followed by exposing the core-shell nanoparticles to a nitrogen precursor at elevated temperatures and ambient pressure for a time sufficient to form a metal nitride. In one embodiment, the amount of metal nitride within the core is between 0.1 and 100% wt. %. In another embodiment, the amount of metal nitride within the core is at least 2% wt. %, or at least 5% wt. %. In yet another embodiment, the amount of metal nitride within the core is between 10 and 70% wt. %, or between 20 and 50% wt. %. In an embodiment where the metal is nickel, the amount of nickel nitride ($Ni_4N$) within the core is between 20 and 50% wt. %.

The nitrogen source is not particularly limited and can be selected from ammonia ($NH_3$), dinitrogen ($N_2$), nitric oxide (NO), and hydrazine ($N_2H_4$). In certain embodiments, the nitrogen source is ammonia. The core-shell nanoparticles may be thermally annealed at about 200, 250, or 300° C. in nitrogen ($N_2$) gas for about 1-5 hours, followed by thermal annealing at 400, 450, 500, 550, or 600° C. in ammonia ($NH_3$) for about 1-10 hours. Although both dinitrogen and ammonia may be used in such process, it is believed that ammonia functions as a precursor of nitrogen in the formation of the metal nitride. The manufacturing process is simple and cost-effective, providing nitride stabilized nanoparticles with higher catalytic activities and improved durability in combination with minimal loading of precious materials compared to catalysts currently in use.

IV. Exemplary Embodiments

The nitride stabilized nanoparticles may have a continuous and nonporous surface shell with a nitride metal core. The nitride metal core has a structure which induces lattice contraction and surface smoothening of the shell. The nitride stabilized nanoparticles may have an external diameter of less than 20 nm with a shell thickness of 0.5 nm to 3 nm, which is equivalent to a shell wall thickness of 2 to 12 atomic layers. In an embodiment, the nitride stabilized nanoparticles have an external diameter of 0.5 nm to 10 nm with a shell wall thickness of 2 to 4 atomic layers (0.5 nm to 1 nm). In another embodiment the nitride stabilized nanoparticles have an external diameter of 3.5 nm and a shell wall thickness of 2 atomic layers (0.5 nm). The nitride stabilized nanoparticles preferably are single crystal, having a single lattice orientation across each nanoparticle.

An exemplary embodiment will be described in detail with reference to FIGS. 3-14. In this embodiment, Ni nanoparticles fabricated on carbon powder supports are used as the core material and Pt is used as the shell material. The experimental data and the density functional theory (DFT) calculations indicate that nitride has a bifunctional effect that facilitates formation of the core-shell structures and improves the performance of the Pt shell by inducing both geometric and electronic effects. Synthesis of inexpensive NiN cores opens up possibilities for designing various transition metal nitride based core-shell nanoparticles for a wide range of applications in energy conversion processes.

In summary, using various techniques the nitride stabilized core-shell structure of the catalyst, which is stable against corrosion during ORR, was investigated. The Examples and Kuttiyiel, et al. (2012) Nano Lett. 12:6266-6271, the contents of which are incorporated herein by reference, reveal that the high ORR activity and durability of PtNiN catalyst is attributed to a Ni nitride core, modifying the behavior of the Pt shell by inducing both geometric and electronic effects. These advances open up broad possibilities for the design and synthesis of various transition metal nitride based core-shell nanoparticles for a wide range of applications in energy conversion processes and devices.

Example 1

Initially, the carbon supported platinum (Pt) and nickel (Ni) electrocatalyst was prepared by mixing 20.7 mg of $K_2PtCl_4$ and 27.7 mg of $Ni(HCO_2).2H_2O$ salts with 74.2 mg high area Vulcan XC72R (E-TEK) carbon black in aqueous solution. While purging with Ar in an ultrasonic bath for an hour, the salts were reduced by adding $NaBH_4$. The mixture obtained was washed and rinsed with Millipore filtered water, and then dried. The dried sample was annealed at 250° C. under $N_2$ gas for 1 hour in a tube furnace which was followed by annealing under $NH_3$ gas for 2 hours at 510° C.

Finally the sample was cooled down to room temperature under NH$_3$ flow in closed furnace. The sample was then washed in 0.1 M H$_2$SO$_4$ to dissolve Ni precipitates on carbon support surfaces, and then rinsed and dried again.

Example 2

Physical characterization of the nanoparticles was performed by electron energy-loss spectroscopy (EELS) mapping for Pt M (2122 eV) and Ni L (855 eV) edges using a scanning transmission electron microscope (STEM) equipped with aberration-correction system (Hitachi; HD-2700C). The microscope is also equipped with a cold field emission electron source and a high resolution Gatan Enfina energy-loss spectrometer. The STEM imaging and EELS were performed using a 1.3 Å electron probe with a probe current of about 50 pA. The STEM convergence angle is around 28 mrad while the collection angle is from 114 to 608 mrad. In this experimental condition, the contrast of images directly related with atomic number (Z-contrast). The energy resolution for EELS is about 0.4 eV estimated form the half-width of zero loss peaks. The carbon-supported nanoparticles were dispersed in water and then deposited on a lacy-carbon TEM grid (EMS, Hatfield, Pa.).

Figure 1:
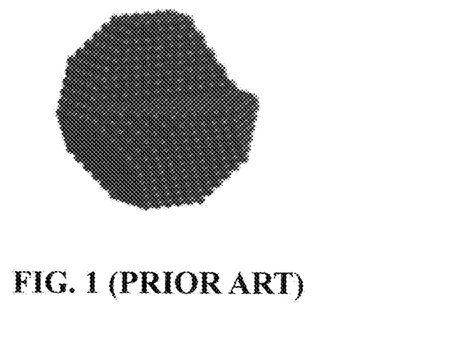
FIG. 1 is a schematic illustration of a single platinum based (Pt) nanoparticle.
Figure 2:
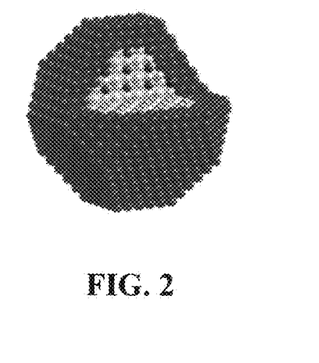
FIG. 2 is a schematic illustration of a single core/shell nanoparticle with platinum (Pt) shell, and nickel/nickel nitride core.
Figure 3A:
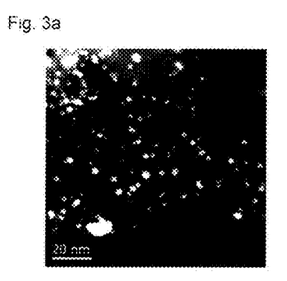
FIG. 3a is high-angle annular dark-field image (HAADF) obtained from scanning transmission electron microscope (STEM) of PtNiN core-shell nanoparticles with a sample size of 300.
Figure 3B:
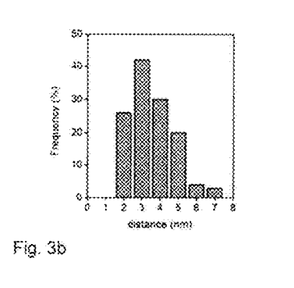
FIG. 3b is a bar chart showing particle size distribution of PtNiN core-shell nanoparticles with a sample size of 300.
Figures 4A, 4B, 4C:
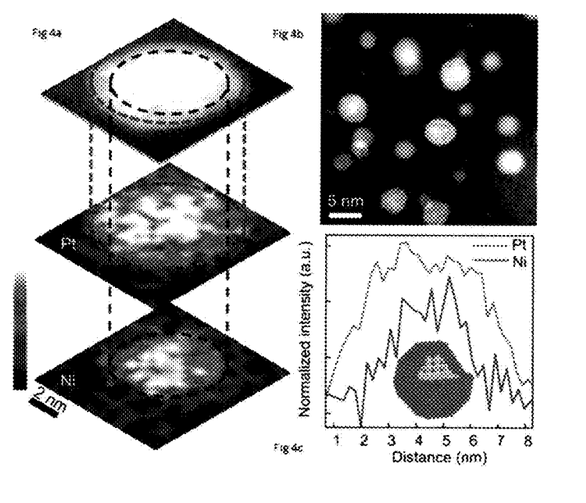
FIG. 4a is a HAADF-STEM image of a PtNiN core-shell nanoparticle with its corresponding two-dimensional electron energy loss spectroscopy (EELS) mapping of Pt M and Ni L signals.
FIG. 4b is a STEM image of PtNiN core-shell nanoparticles.
FIG. 4c is a plot showing EELS line-scan profiles of Pt and Ni in a single nanoparticle along with schematic representation of a single PtNiN nanoparticle of FIG. 2.

The resulting nanoparticles had a nearly sphere-like shape as shown in FIG. 3a and FIG. 4b with an average diameter of 3.5 nm (~2-7 nm) as shown in FIG. 3b. Overlapping the two-dimensional mapping of Pt and Ni EELS signal from a single nanoparticle as shown in FIG. 4a (dotted lines) validates the core-shell structure. The EELS line scan profile indicates the distribution of Pt and Ni components in a representative single nanoparticle, where the Pt shell thickness can be directly measured and plotted as shown in FIG. 4c. The Pt shell thickness measured on various nanoparticles was around 0.5 to 1.0 nm, equivalent to 2 to 4 monolayers of Pt on the Ni rich core. The overall weight percentage of Pt and Ni in the carbon supported PtNiN core-shell nanoparticles was 10.2% and 3.5% respectively which accounts to a molar ratio of 1, as determined by inductively coupled plasma optical emission spectrometry (ICP-OES) measurements.

Example 3

The core-shell nanoparticles were further characterized using synchrotron X-ray diffraction (XRD). The X-ray measurements were performed at the X7B beamline at National Synchrotron Light Source (NSLS), Brookhaven National Laboratory (BNL; Upton, N.Y.). The instrument parameters (Thompson-Cox-Hastings profile coefficients) were derived from the fit of a LaB$_6$ reference pattern. Two sets of measurements were done: One with PtNi sample reduced in N$_2$ at 250° C. and the other was PtNiN sample annealed at 510° C. in NH$_3$. The wavelength of X-ray used was 0.3184 Å. XRD patterns were recorded on a Mar345 image plate detector and the recording time for a spectrum was ca 2.6 min. All the XAS (x-ray absorption spectroscopy) measurements were carried out at the NSLS, BNL using Beam Line X19A. The electrocatalyst was pressed and sealed in an electrochemical cell. The measurements were carried out at the Pt L$_3$ edge (11,564 eV) and Ni K edge (8333 eV) in 1M HClO$_4$ at different potentials in room temperature. The data were processed and analyzed by Athena and Artemis software (Ravel, B.; Newville, M. *J Synchrotron Radiat* 2005, 12, 537-541).

The synchrotron X-ray diffraction (XRD) patterns suggest the formation of nickel-nitride (NiN) compound. The diffraction pattern of the as prepared core-shell nanoparticles shown in FIG. 5a exhibits only the reflections of Pt and Ni$_4$N that has the structure of primitive cubic lattice. The pattern points to the formation of a PtNi solid-solution alloy with an average size of 3.6 nm estimated from the Scherer's equation. Another feature is that peaks ascribed to reflections from (200) and (220) of the Ni metal phase are missing, indicating that the catalyst contains mostly NiN phases. A relatively smaller peak appearing at 8.98° may correspond to a Ni$_3$N or Ni metal phase and both having (111) phase reflections at the 20 value.

Example 4

Figure 6:
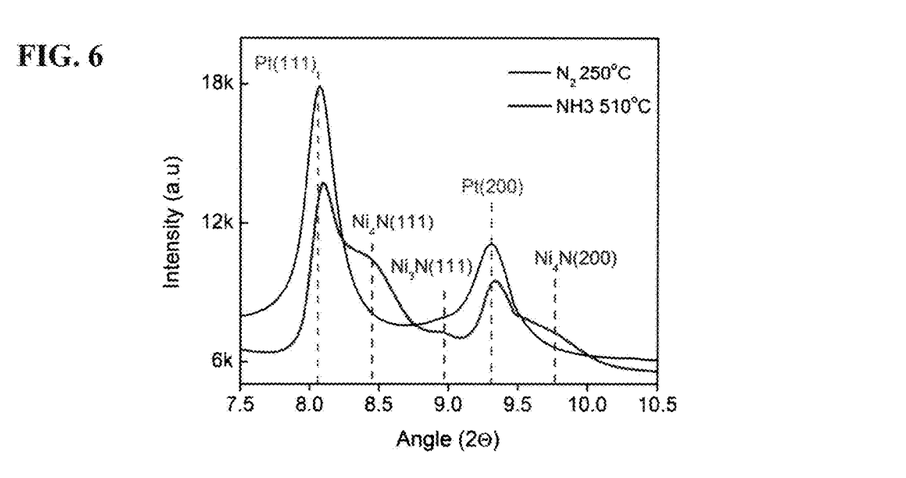
FIG. 6 is a plot showing synchrotron XRD diffraction for PtNi nanoparticles annealed in $N_2$ at 250° C. and in $NH_3$ at 510° C. The XRD analyses confirm that Ni in the catalyst is nitrided and forms a rich $Ni_4N$ species.

To clarify the absence of Ni metal, the XRD pattern of the PtNi nanoparticles annealed at 250° C. in N$_2$ was analyzed before NH$_3$ treatment. PtNi forms a solid solution alloy when annealed at 250° C. in N$_2$ without showing any discrete peaks for Ni (see FIG. 6). The Ni$_3$N (111) phase appears only after the catalyst undergoes the NH$_3$ treatment. This suggests that some of the Ni$_4$N phases are decomposed to Ni$_3$N phases, which might happen when the sample is cooled down to room temperature in an NH$_3$ environment, as Ni$_3$N is formed at temperatures between 200 and 350° C. Moreover the inclusion of N in the PtNi nanoparticles pushes the Pt (111) peak to higher angles, as shown in FIG. 6, and an increase line broadening was also observed indicating a distortion of the lattice due to N atoms. This change in the lattice structure is due to the chemical interaction of metal atoms with N, resulting in the formation of nitrides. Thus, synchrotron XRD confirms that Ni in the PtNiN core-shell nanoparticles is nitrided forming Ni$_4$N species.

Example 5

Figures 5A, 5B, 5C:
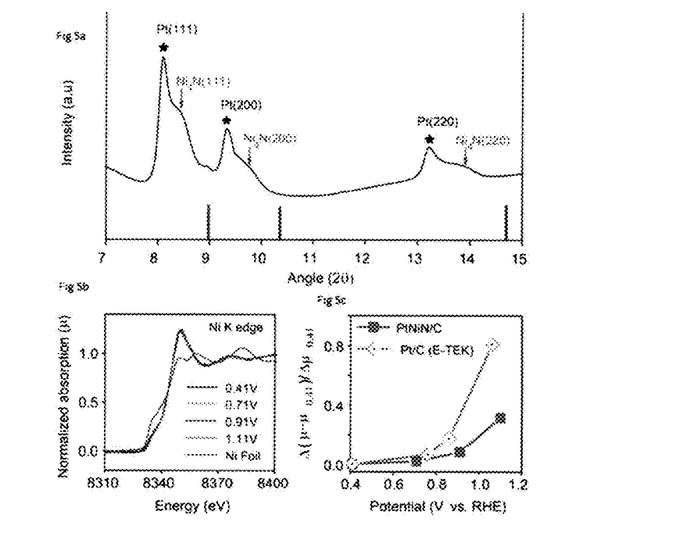
FIG. 5a is a plot of a synchrotron X-ray diffraction (XRD) pattern for PtNiN catalyst showing Pt and $Ni_4N$ phases. The lines next to the x-axis denote $Ni_3N$ phase.
FIG. 5b is a plot showing in situ normalized X-ray absorption near edge structure (XANES) of Ni K edge for PtNiN nanoparticles at various potentials.
FIG. 5c is a plot showing comparison of the change of the Pt adsorption edge peaks of the XANES spectra for PtNiN/C and Pt/C as a function of potential obtained in 1 M $HClO_4$.

The stabilizing effect of the core-shell structure for PtNiN nanoparticles was determined by in situ X-ray absorption near edge spectroscopy (XANES) as shown in FIG. 5b. In situ XANES of the Ni K edges from the PtNiN nanoparticles in 1 M HClO$_4$, together with reference material, viz., Ni foil (thickness≈10 µm) suggest that electronic properties of Ni have been changed by alloying with N and Pt. Also no changes in energy were observed at various potential of 0.41-1.11 V, signifying that the Pt shell is protecting the Ni core from oxidation. The XANES data for Pt L$_3$ edges offer strong evidence of decreased oxidation of Pt in PtNiN nanoparticles in comparison with commercially available Pt nanoparticles as shown in FIG. 5c and FIG. 8. The high Pt oxidation potential (lower extent of Pt oxidation) of PtNiN catalyst suggests the interaction of the underlying metal via geometric and electronic effects. A decreased Pt oxidation can also be observed from the comparison of voltammetry curves for PtNiN/C and Pt/C catalyst shown in FIG. 7.

Example 6

The electrocatalytic activity of carbon supported PtNiN core-shell nanoparticles toward the ORR was benchmarked against the commercially available Pt/C catalyst (E-TEK, 10% wt. of 3.2 nm Pt nanoparticles on Vulcan XC-72 carbon support). For both PtNiN/C catalyst and Pt/C catalyst, an aqueous dispersion (1 mg/mL) was prepared and sonicated for 5 minutes. A thin film of the electrocatalyst was prepared on a glassy carbon rotating electrode (area: 0.196 cm$^2$) for electrochemical measurements using 15 µL of the dispersion. The electrodes were then covered by a small amount of a Nafion solution (10 µL of 2 µg/5 µL) and dried in air before measurements. The loading amount of Pt for PtNiN catalyst was 7.84 µg/cm² and for Pt/C catalyst was 7.65 µg/cm², based on the geometric electrode area and the actual content of Pt measured by ICP. Solutions were prepared from Optima perchloric acid obtained from Fisher and MilliQ UV-plus filtered water (Millipore). An Ag/AgCl/KCl (3M) electrode was used with a double-Junction chamber as a reference and all potentials, E, are quoted with respect to reversible hydrogen electrode (RHE). Cyclic Voltammetry (CV) characterization of the catalysts in the absence of oxygen was typically carried out in the potential range from 1.1 V to 0.0 V at a scan rate of 20 mV/s in Ar-saturated 0.1M $HClO_4$ electrolyte.

Figure 7A:
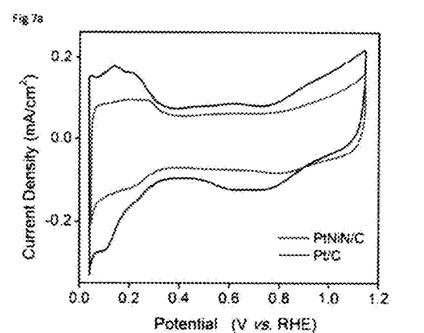
FIG. 7a is a plot showing CV curves for Pt/C (E-TEK) and PtNiN core-shell nanoparticles in 0.1M $HClO_4$ acid at a scan rate of 20 mV/s. For Pt/C and PtNiN core-shell nanoparticles the Pt loading was 7.65 and 7.84 g/cm$^2$, respectively.
Figure 7B:
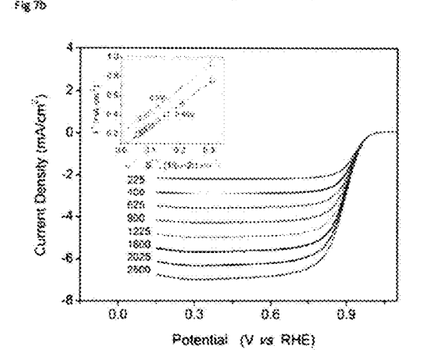
FIG. 7b is a plot showing the ORR polarization curves for PtNiN core-shell nanoparticles in 0.1 M $HClO_4$ acid at a scan rate of 10 mV/s at various rpm. Inset shows the Koutecky-Levich plot at 0.9 and 0.85V.
Figure 8:
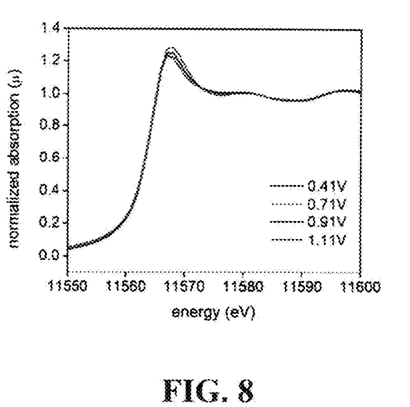
FIG. 8 is a plot of in situ XANES of Pt L3 edge for PtNiN electrocatalyst at various potentials.
Figure 9A:
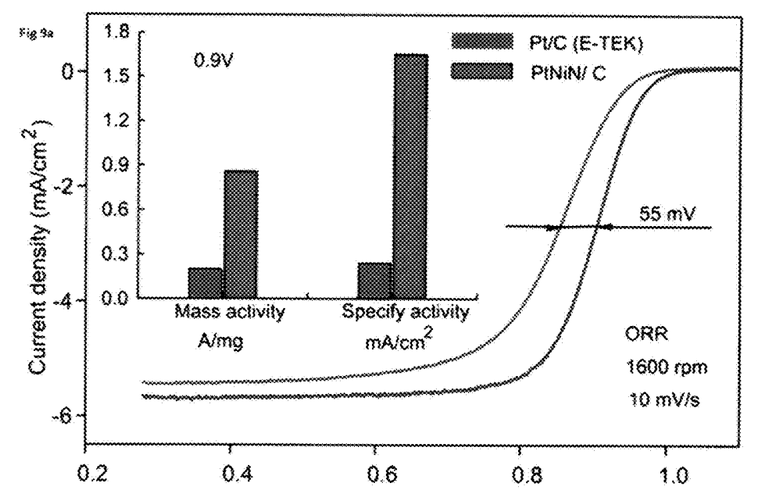
FIG. 9a is a plot showing polarization curves for ORR of Pt/C and PtNiN/C nanoparticles on an RDE electrode. Pt loading for PtNiN/C and Pt/C were 7.84 and 7.65 µg/cm$^2$ respectively. The inset shows a bar diagram of mass and specific activities for PtNiN/C and Pt/C catalysts on the RDE electrode.
Figure 9B:
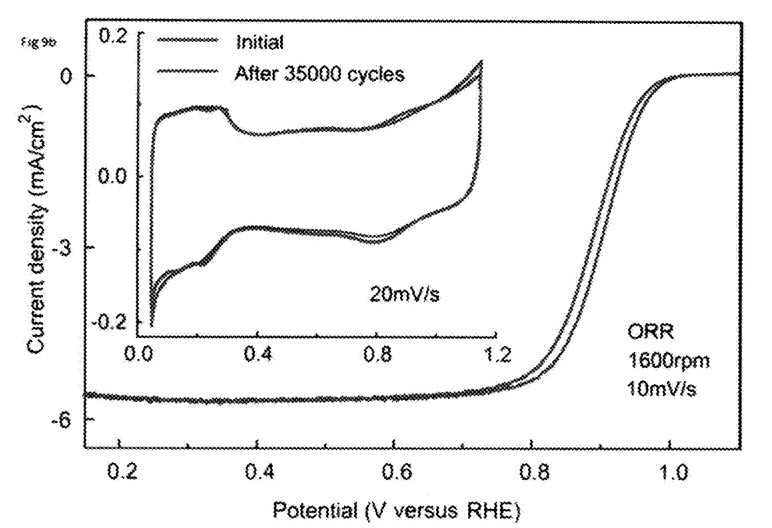
FIG. 9b is a plot showing ORR polarization and voltammetry (inset) curves of PtNiN core-shell nanoparticles before and after 35000 cycle test between 0.6 and 1.05 V in 0.1 M $HClO_4$.
Figure 10A:
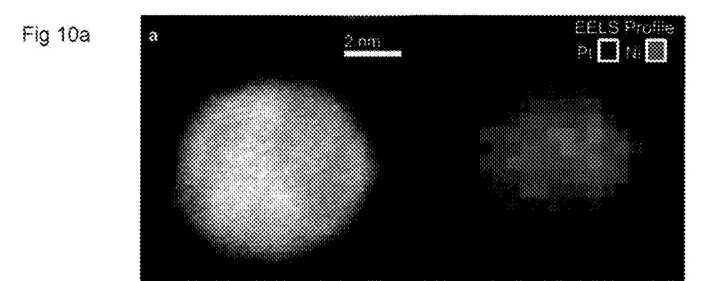
FIGS. 10a-10b are HAADF images of representative nanoparticles (a) and (b) after potential cycling along with its respective 2-D EELS mapping of Pt M edge (dark) and Ni L edge (light).
Figure 10B:
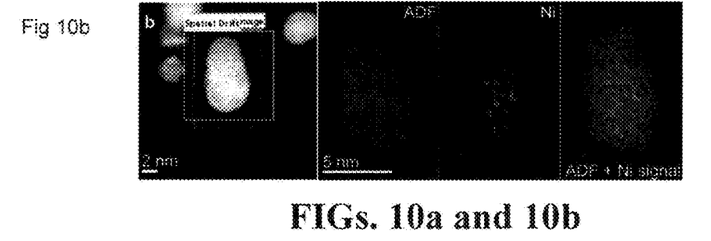
Figure 11A:
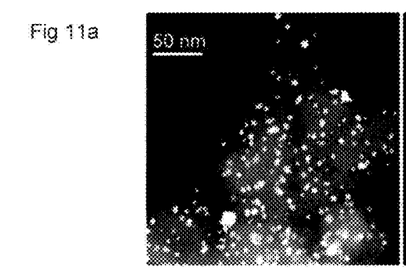
FIG. 11a is a low-mag HAADF-STEM image of PtNiN core-shell nanoparticles after 35000 potential cycles.
Figure 11B:
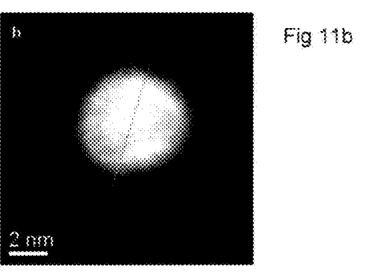
FIG. 11b is a high resolution HAADF image of PtNiN core-shell nanoparticles after 35000 potential cycles.
Figure 11C:
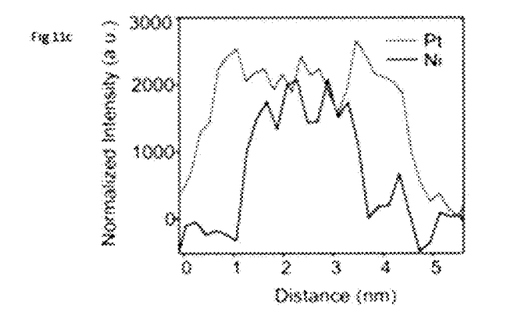
FIG. 11c is a plot showing EELS line-scan profiles to rationalize the distribution of Pt and Ni components in a single representative nanoparticle from FIG. 11b after cycling. The results indicate that PtNiN nanoparticles stay intact without losing their core-shell structure after potential cycling.

The cyclic voltammetry (CV) curves for PtNiN catalysts shown in FIG. 7 did not show any anodic currents ascribed to the oxidation/dissolution of Ni, demonstrating that Ni is protected by the Pt shell. The half wave potential measured from the ORR polarization curves at 1600 rpm (see FIG. 9) for PtNiN core-shell catalyst was 905 mV, which was 55 mV higher than pure Pt/C catalyst. The kinetic current was calculated from the ORR polarization curves by using the Koutecky-Levich equation at various rpm from 225 to 2500 rpm in $O_2$-purged 0.1 M $HClO_4$ solution at a sweep rate of 10 mV/s. RDE cycling stability test for PtNiN catalyst were conducted in air saturated 0.1M $HClO_4$ in the potential range from 0.6 to 1.05V at room temperature. ORR polarization curves were recorded in $O_2$-saturated electrolyte at various rotation rates from 225 to 2500 rpm at a scan rate of 10 mV/s. RDE cycling stability test for PtNiN catalyst were conducted in air saturated 0.1M $HClO_4$ in the potential range from 0.6 to 1.05 V at room temperature. For the ORR at a RDE, the Koutechy-Levich equation can be described as follows:

$$\frac{1}{i} = \frac{1}{I_k} + \frac{1}{B\omega^{1/2}}$$

where i is the experimentally measured current, $I_k$ is the kinetic current, B is a constant and ω is the rotation rate. Using the data obtained from the nanoparticles (see FIG. 7b), the Koutecky-Levich plot, i.e., the inverse current (1/i) plotted as a function of the inverse of the square root of the rotation rate ($\omega^{1/2}$), is presented in the inset figure of FIG. 7b. The kinetic currents for ORR can be determined from the intercepts of the 1/i axis at $\omega^{1/2}=0$.

To calculate the mass activity, the kinetic current was normalized to the loading amount of Pt. To compare specific activity, the current was normalized to the electrochemically active surface area (ECSA). The ECSA was calculated by measuring the charge collected in the $H_{upd}$ adsorption/desorption region after double-layer correction and assuming a value of 210 µC/cm² for the adsorption of a hydrogen monolayer. At room temperature, the PtNiN catalyst exhibited mass and specific activities of 0.86 A/$mg_{Pt}$ and 1.65 mA/cm², respectively at 0.9 V versus a reversible hydrogen electrode (RHE), which were both around 4.5 to 6.5 times greater than that of the Pt/C (0.20 A/$mg_{Pt}$ and 0.24 mA/cm²).

Example 7

Accelerated durability tests were also performed by applying linear potential sweeps between 0.6 and 1.05 V at 50 mV/s in air-saturated 0.1 M $HClO_4$ solution at room temperature. After 35000 cycles, the CV measurements showed no loss in ECSA for the PtNiN core-shell electrocatalyst (see FIG. 9b). In contrast with Pt/C that has been demonstrated to lose almost 45% of its initial area, the PtNiN core-shell electrocatalyst had much better resilience under high oxidizing conditions. To measure the ORR degradation after cycling the initial and final half wave potentials were compared at 1600 rpm in $O_2$ saturated 0.1 M $HClO_4$ solution. After 35000 cycles the ORR measurements showed only 11 mV loss in its half wave potential, suggesting that the PtNiN catalyst has a very good stability for the ORR. STEM-EELS analysis was used to examine the structure of the PtNiN core-shell nanoparticles after potential cycling to elucidate the questions about Ni leaching out in harsh acid environment (see FIG. 10 and FIG. 11). The overlapping of the Ni EELS and Pt signal of a single representative nanoparticle (FIG. 10a and FIG. 10b) after 35000 potential cycles clearly shows that the core-shell structure of the PtNiN nanoparticle is intact further attesting the performance durability of the catalyst.

Example 8

Figure 12:
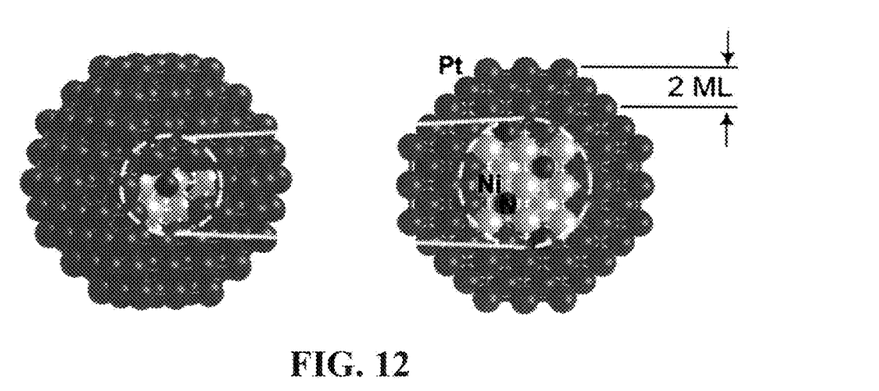
FIG. 12 is a schematic of a sphere-like $Pt_{2ML}/Ni_4N$ nanoparticle model with ~1.7 nm used for DFT calculations.

To elucidate the enhanced ORR activity and durability of PtNiN/C compared to those of Pt/C, density functional theory (DFT), calculations were carried out using a sphere-like nanoparticle model with 1.7 nm as shown in FIG. 12. Specifically, the Vienna ab initi simulation package (VASP) code was applied for spin-polarized density functional theory (DFT) calculations. Only the Γ point for k sampling and a cut-off energy of 400 eV for nanoparticle calculations were used, while (3×3×3) was used for the bulk calculation of $Ni_4N$. The projector augmented wave method (PAW) with the generalized gradient approximation (GGA) using the revised Perdew-Burke-Ernzerhof (RPBE) function was used. For the nanoparticle calculations, to simulate the core-shell nanoparticle (PtNi$_4$N; Pt is a shell and Ni$_4$N is a core) with a composition of 182 Pt, 19 Ni, and 4 N atoms, a sphere-like nanoparticle model with ~1.7 nm was constructed. As described, the core is a $Ni_4N$-like structure having a crystal lattice defined as a face centered cubic. All atoms were fully relaxed for optimizations.

In order to examine the ORR activity of the electrocatalysts, the binding energy of atomic oxygen was calculated on the (111) plane of a nanoparticle (BE-O). The binding energy is defined as

BE-O=E[O-NP]-E[NP]-E[O], where E[O-NP], E[NP], and E[O], respectively, are the calculated electronic energies of an adsorbed oxygen-atom on a nanoparticle, a clean nanoparticle, and an oxygen atom ($^3$O). In addition to the BE-O calculations, surface strains were estimated to examine geometric effects according to $(a-a_o)/a_o$. a and $a_o$ are the averaged Pt—Pt distance in the Pt monolayer and the calculated Pt—Pt distance of bulk Pt (2.824 Å). In particular, to interpret the enhanced stability of PtNiN/C, the diffusion of Pt atoms was examined from the second layer to the defect sites on the topmost layer (i.e. the vertex site).

Figures 13A, 13B:
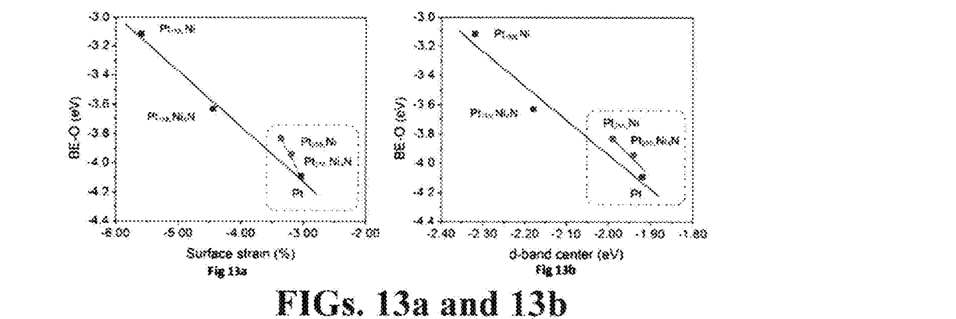
FIG. 13a-13b are plots showing calculated binding energy of oxygen (BE-O) as a function of (a) surface strain and (b) d-band center. "1ML" and "2ML" are one monolayer and two monolayers, respectively. The dashed boxes are for the two monolayers.

To simulate the experimental finding of the $Ni_4N$ of the core material shown in FIG. 5, the mole ratio of Ni and N was kept at approximately 20% by using the bulk $Ni_4N$ structure ($a_{0,DFT}$=3.756 Å) and to save computational time, only two Pt layers were used for modeling the Pt shell composed of 182 Pt, 19 Ni, and 4 N atoms ($Pt_{2ML}Ni_4N$). As shown in FIG. 13 and Table 1, the surface strain, the d-band center of Pt in the shell, and the binding energy of oxygen (BE-O) were calculated as a descriptor for the ORR activity.

TABLE 1

Calculated binding energy of oxygen (BE-O), surface strain and d-band center (eV) for different structures.

|  | d-band center (eV) | Surface strain (%) | BE-O (eV) |
|---|---|---|---|
| Pt | −1.92 | −3.04 | −4.09 |
| $Pt_{1mL}Ni_4N$ | −2.18 | −4.46 | −3.63 |
| $Pt_{1mL}Ni$ | −2.32 | −5.60 | −3.12 |
| $Pt_{2mL}Ni_4N$ | −1.94 | −3.19 | −3.94 |
| $Pt_{2mL}Ni$ | −1.99 | −3.36 | −3.83 |

Figure 14A:
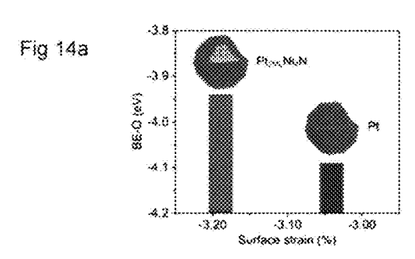
FIG. 14a is a plot showing comparison of surface strain versus predicted binding energy of oxygen (BE-O) on the $Pt_{2ML}Ni_4N$ and Pt nanoparticle models with 1.7 nm. The more negative strain corresponds to further compression. An atomic oxygen was placed at a fcc active site on the (111) plane to predict the BE-Os.
Figure 14B:
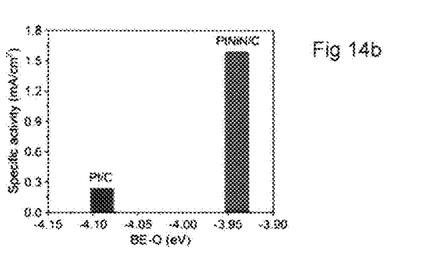
FIG. 14b is a plot showing Pt specific activity against BE-O on PtNiN/C and Pt/C.
Figure 14C:
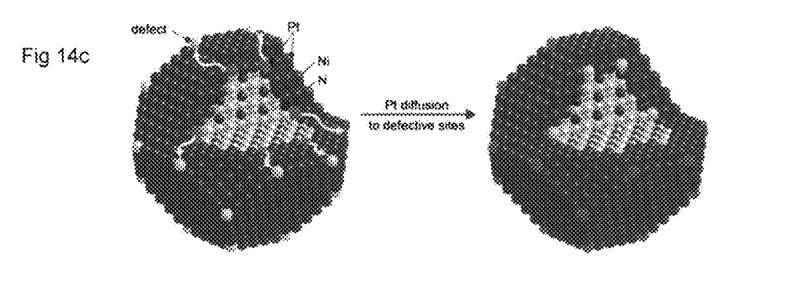
FIG. 14c is a schematic of the inner Pt diffusion process to the defective sites at the vertex during cycling in the electrolyte. For clarity, defects are marked with a light shade of gray and the inner Pt atoms involved in diffusion are marked with a dark shade.

Similar to the previous study (Kuttiyiel, K. A.; Sasaki, K.; Choi, Y.; Su, D.; Liu, P.; Adzic, R. R. *Energ Environ Sci* 2012, 5, (1), 5297-53048), an oxygen atom was placed at a fcc active site on the nanoparticle to calculate BE-Os (see FIG. 12). The results show that $Pt_{2ML}Ni_4N$ and $Pt_{2ML}Ni$ (two monolayers of the Pt shell on a Ni core) behave more like a pure Pt than $Pt_{1ML}Ni$ (one monolayer of the Pt shell on a Ni core) and $Pt_{1ML}Ni_4N$ (one monolayer of the Pt shell on a Ni4N core). By adding one more layer of Pt in the shell, the effects of Ni and $Ni_4N$ cores on the Pt shell are significantly decreased (see FIG. 13). In addition, the surface contraction in the Pt shell is reduced by changing the core from Ni to $Ni_4N$, leading to an up-shifted Pt d-band center and the strengthened O—Pt interaction (BE-O, −3.83 eV for $Pt_{2ML}Ni$ and −3.94 eV for $Pt_{2ML}Ni_4N$). Yet, compared to pure Pt, a more contraction on the surface of $Pt_{2ML}Ni_4N$ is observed (surface strain; −3.19% for $Pt_{2ML}Ni_4N$ and −3.04%, for Pt, FIG. 14), which leads the down-shifted d-band center of Pt (FIG. 13) and the weaker BE-O (BE-O; −3.94 eV for $Pt_{2ML}Ni_4N$ and −4.09 eV for Pt, FIG. 14a). Therefore, the DFT results support the experimental finding of the higher ORR activity of PtNiN than Pt (FIG. 14b). It is believed that too much Ni in the core leads to the instability of the nanoparticles, due to a too highly strained surface (FIG. 13 and Table 1). It may be evident that the $Ni_3N$ phase is negligibly found in the X-ray spectrum compared to the $Ni_4N$ phase (FIG. 6). It is also well-known that PtNi core-shell electrocatalysts are not durable in acidic condition due to the significant Ni dissolution. (Wang, C. et al. *Adv. Funct. Mater.* 2011, 21 (1) 147-152).

Example 9

To gain an understanding of the enhanced durability of PtNiN/C, in the above-noted DFT study, the unavoidable imperfection of the nanoparticles were taken into account. It has been found that vacancies are more favorably formed at the vertex and edge sites than at terraces owing to their lower formation energies. Thus only the diffusion of Pt from a vertex of the inner shell to vacancy sites at the vertex of the outmost shell was considered. Using the $Pt_{2ML}Ni_4N$ model, the calculations show that the energy cost for the Pt diffusion depends on the existence of N atoms. For the inner Pt atom next to the N atom, it needs only 0.15 eV, while for those far away from the N atom the needed energy is 0.33 eV, which is consistent with that using $Pt_{2ML}Ni$ (0.37 eV). In contrast, pure Pt requires a much higher energy for the diffusion (0.42 eV). Therefore, these calculations suggest that $Pt_{2ML}Ni_4N$ has a higher stability than Pt, by enabling the easier diffusion of Pt from the inner shells to the surfaces, filling the defect sites and thus preventing the dissolution of Pt into the electrolyte. Accordingly, a higher N concentration may facilitate the Pt diffusion and therefore, increase the durability of the nanoparticles.

To further examine this effect, one more N atom was added at the interface between the Pt shell and the $Ni_4N$ core, assuming the presence of a localized $Ni_3N$, as shown in FIG. 5. By interacting with one more N atom, the energy cost for the inner Pt atom to diffuse to the vacancy site on the surface is decreased from 0.15 to 0.10 eV, confirming that the concentration of N is crucial to the durability of the catalysts. Overall, using Ni nitrides as the core enhances the ORR activity and durability via both geometric and electronic effects. The nitriding of the Ni core tunes the electronic structure of the Pt shell to display a higher ORR activity than Pt (electronic effect). Simultaneously, the presence of N atoms in the core allows a facile diffusion of interacted Pt from inner shells to the surface, filling the vacancy sites (geometric effect), resulting in augmented durability of the catalysts.

V. Energy Conversion Devices

In a preferred application, the nitride stabilized nanoparticles may be used as an electrode in an energy conversion device such as a fuel cell. The use of the nitride stabilized nanoparticles advantageously provides minimal loading of precious metals, a heightened catalytic activity, and improved durability. Use of the nitride stabilized nanoparticles in a fuel cell is, however, merely exemplary and is being used to describe a possible implementation of embodiments of the present invention. Implementation as a fuel cell electrode is described, for example, in U.S. Pat. No. 7,691,780 to Adzic. It is to be understood that there are many possible applications for the nitride stabilized nanoparticles which may include, but are not limited to, charge storage devices, applications which involve corrosive processes, as well as various other types of electrochemical or catalytic devices.

Figure 15:
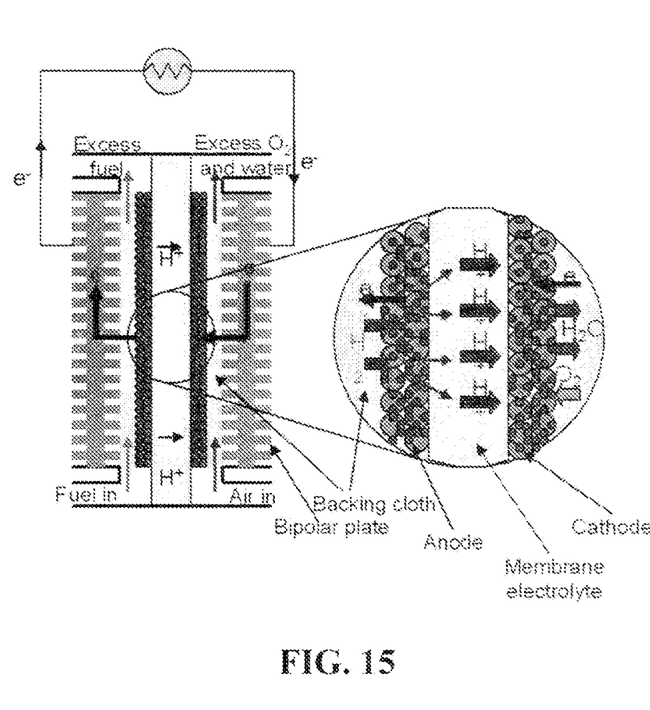
FIG. 15 is a schematic of a PEMFC having the electrodes with the disclosed nitride stabilized nanoparticles.

As shown in FIG. 15, a PEMFC that employs the nitride stabilized nanoparticles can, for example, use hydrogen gas ($H_2$) as a fuel source, which is introduced through a first electrode whereas an oxidant, such as oxygen ($O_2$), is introduced through the second electrode. In one exemplary configuration, the first electrode is the anode and the second electrode is the cathode. Preferably, the cathode is comprised of the nitride stabilized Pt nanoparticles. Under standard operating conditions electrons and ions are separated from the fuel at the anode such that the electrons are transported through an external circuit and the ions pass through an electrolyte. At the cathode, the electrons and ions combine with the oxidant to form a waste product which, in this example, is $H_2O$. The electrical current flowing through the external circuit can be used as electrical energy to power conventional electronic devices.

The increase in the ORR attainable by incorporation of the nitride stabilized nanoparticles in one or more electrodes will produce an increase in the overall energy conversion efficiency and durability of the fuel cell. Consequently, for a given quantity of fuel, a larger amount of electrical energy will be produced when using the nitride stabilized nanoparticle electrodes compared to conventional nanoparticle electrodes. Furthermore, the increased durability provided by the nitride stabilized nanoparticle electrodes means that fuel cells which incorporate such electrodes can be used for longer periods of time without a substantial drop in performance.

It will be appreciated by persons skilled in the art that the embodiments of the present invention are not limited to what has been particularly shown and described in the specification. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The specification has not attempted to exhaustively enumerate all possible variations. That alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent application Publications cited throughout this specification are hereby incorporated by reference in their entireties as if fully set forth in this specification.

The invention claimed is:

1. A catalyst nanoparticle comprising:
   a non-noble metal solid solution core with a size of less than 100 nm along at least one of three orthogonal axes, and
   a continuous and nonporous noble metal shell surrounding the non-noble metal solid solution core;
   wherein the non-noble metal solid solution core comprises a nitride of a non-noble metal selected from the group consisting of nickel (Ni) nitride, cobalt (Co) nitride, iron (Fe) nitride, copper (Cu) nitride and mixtures thereof.

2. The catalyst nanoparticle of claim 1, wherein the catalyst nanoparticle is substantially spherical having an external diameter of less than 20 nm.

3. The catalyst nanoparticle of claim 1, wherein, the nonporous noble metal shell has a thickness, of between 0.5 nm and 3 nm.

4. The catalyst nanoparticle of claim 1, wherein the nonporous noble metal shell comprises at least one noble metal selected from the group consisting platinum (Pt), palladium (Pd), gold (Au), rhodium (Rh), iridium (Ir), ruthenium (Ru), silver (Ag), rhenium (Re), alloys and combinations thereof.

5. The catalyst nanoparticle of claim 4, wherein the at least one noble metal comprises platinum (Pt).

6. The catalyst nanoparticle of claim 1, wherein the nonporous noble metal shell comprises 1 to 12 monolayers of platinum (Pt).

7. The catalyst nanoparticle of claim 6, wherein the nonporous noble metal shell comprises 2 to 4 monolayers of platinum (Pt).

8. The catalyst nanoparticle of claim 1, wherein the non-noble metal solid solution core comprises nickel nitride $Ni_4N$.

9. The catalyst nanoparticle of claim 8, wherein an amount of nickel nitride $Ni_4N$ within the non-noble metal solid core is between 20 and 50% wt. %.

10. An energy conversion device comprising:
    a first electrode;
    a conducting electrolyte; and
    a second electrode, wherein at least one of the first or second electrodes comprises a plurality of catalyst nanoparticles of claim 1.

11. The energy conversion device of claim 10, wherein the catalyst nanoparticle comprises platinum (Pt) shell having a shell wall thickness of 2 to 4 atomic layers and nickel (Ni) core comprises 5-50 wt. % nickel (Ni) nitride.

12. The energy conversion device of claim 11, wherein the energy conversion device is a fuel cell.

* * * * *